Sept. 11, 1923.
W. E. WILLIAMS
DEMOUNTABLE RIM FASTENING
Filed April 25, 1921
1,467,410
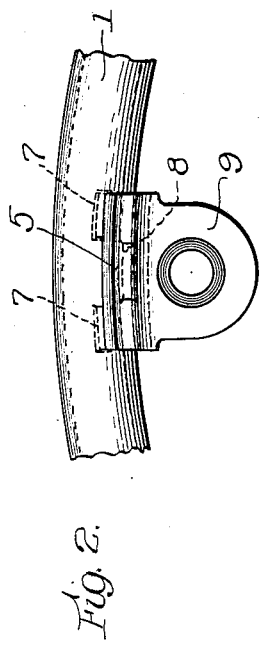
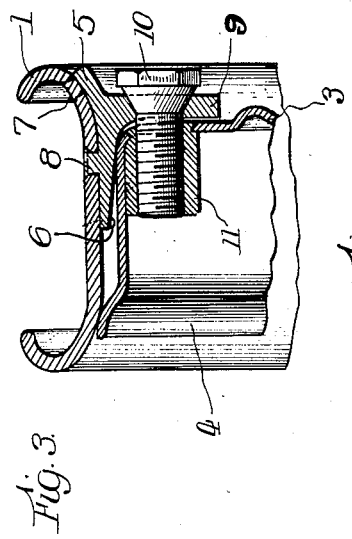
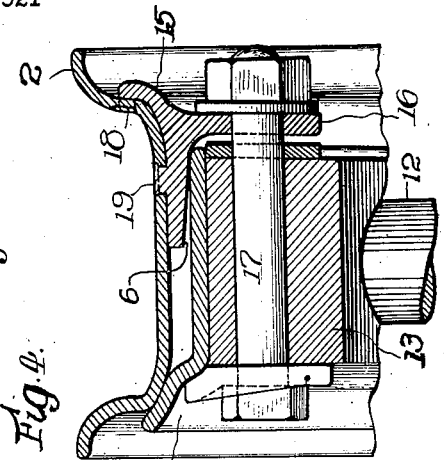
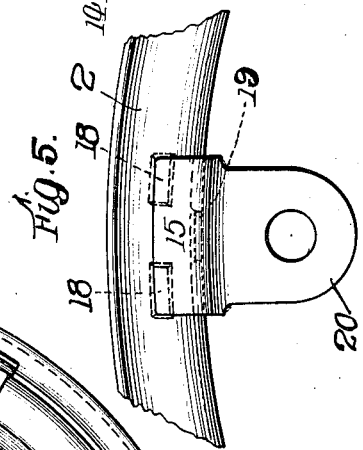
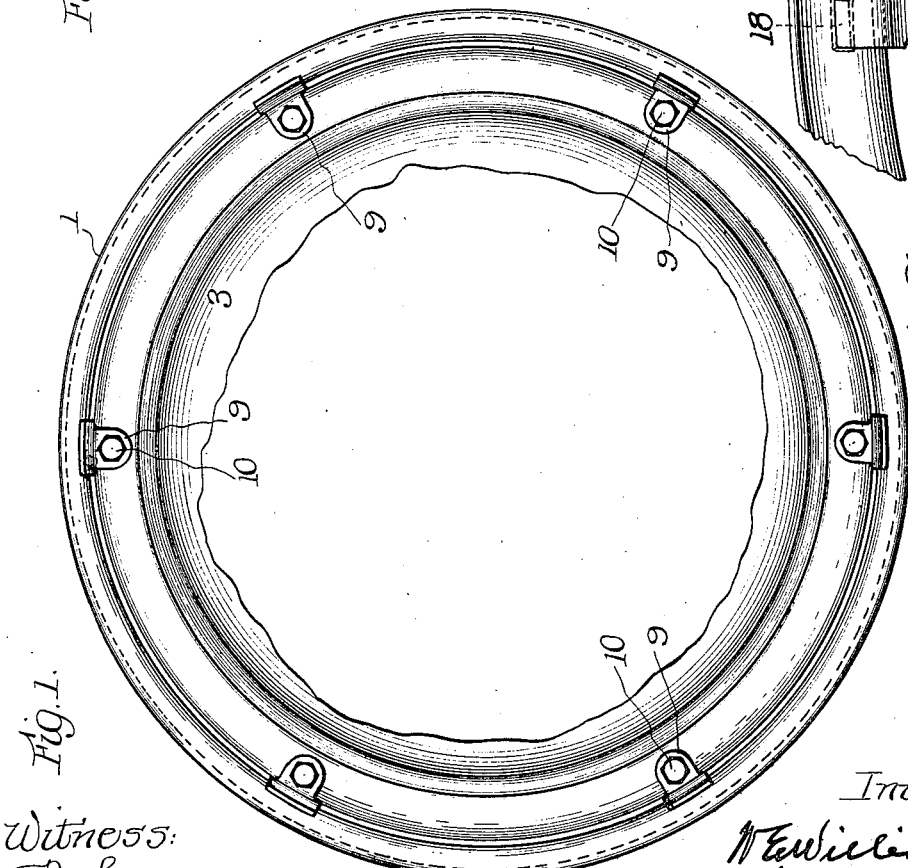
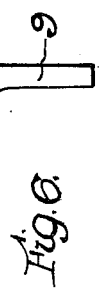
Witness:
A. J. Sauser.
Inventor:
W. E. Williams Patented Sept. 11, 1923.

1,467,410

UNITED STATES PATENT OFFICE.

WILLIAM ERASTUS WILLIAMS, OF CHICAGO, ILLINOIS.

DEMOUNTABLE-RIM FASTENING.

Application filed April 25, 1921. Serial No. 464,237.

*To all whom it may concern:*

Be it known that I, WILLIAM ERASTUS WILLIAMS, a citizen of the United States, a resident of Chicago, in the county of Cook and State of Illinois, have invented a new and useful Improvement in Demountable-Rim Fastenings, of which the following is a specification.

My invention relates to demountable rims for automobiles and clip fastenings used in this demounting service.

The object of the invention is to furnish a rim with clips firmly and cheaply secured to the demountable rim itself.

The invention is set forth in the claim.

Reference will be had to the accompanying drawing in which Figure 1 is an elevation of a rim and a portion of a disk wheel to which my device is attached.

Figure 2 is an enlarged elevation of one of the lug fastenings.

Figure 3 is a transverse section through one of the fastenings and the rim of the wheel disk.

Figure 4 is a sectional view through one of the fastenings when used on a wooden wheel.

Figure 5 is an elevational view of the lug fastening used in Figure 4.

Figure 6 shows a cross section of a little bar out of which the lugs 5 and 15 may be made by shearing off the bar into transverse sections.

Figure 3 shows the lugs secured to what are known as "clincher" rims and Figures 4 and 5 show the "straight side" rims.

In the drawing 1 indicates the demountable rim for a pneumatic tire of the ordinary pattern which in Figures 1, 2 and 3 is shown of the clincher type. In Figure 4 the rim is of a different shape, being for the "straight side" type of rim and it is indicated there as 2. 3 indicates a steel disk wheel having the margin of the disk turned over into a supporting tread flange 4.

Secured to the rim edge there are the lugs 5 which have wedge surfaces 6 and are secured to the rim 1 by means of some little projections 7 and 8 which project through apertures in the rim and are riveted over as indicated in Figure 3. The lug 5 has a projection 9 through which a screw 10 passes into a fixed nut 11 on the inside of the disk and by means of this screw 10 the lugs 5 and the rim attached thereto is held on to the wheel.

. The arrangement of the projections 7 and 8 in the form shown in the drawing is such that the strains of the screws 10 has no tendency to withdraw the rivets 7, 8.

In Figure 4 with the straight side tire 2, 12 indicates the spokes of a wooden wheel and 13 indicates the felloe and 14 indicates the felloe band. The lug used with this rim 2 is indicated by 15 and has a slightly different projection 16 from that shown in Figure 3. Instead of the screws 10 used in Figure 3 I use the bolts 17 which pass through the wooden felloe in the ordinary manner of bolts used in this service.

Projections 18 and 19 of the lugs 15 pass through apertures in the sides of the rim and are riveted over as is shown by the drawing. The position of these projections 18 and 19 are practically the same as those of 7 and 8 shown in Figure 3 as relates to the matter of strain being chiefly in shear and little or no strains being placed upon the riveted feature of the projections into the apertures of the rim which is a great desideratum.

In the manufacture of these lugs 15 I prefer to roll a special section such as is indicated in cross section in Figure 6 and then shear this section transversely to form the lugs as indicated and punch off the surplus metal as may be required for the rounded portion 20 and the spaces between the several projections 7, 8 and 18 and 19. After the punching operations have been completed one flange of the special section is bent up to the form shown as indicated by the dotted lines 21 in Figure 6.

It may be desirable even when the lugs are made of castings more or less to shape to bend them slightly after they are cast to fit the contour of the rim as shown.

What I claim is:—

The combination with a wheel disk bent laterally to form a peripheral seat flange for directly supporting one side of a wheel rim while slightly separated from the opposite side, of a rim resting on said flange, a series of malleable spaced wedges inserted between said seat and one side of the rim, closely fitting the latter, curved outward around its outer side, and provided with perforated lugs extending radially inward, and bolts passing through the lugs and engaging the disk inside its flange, said wedges having rivets projecting into the rim in the plane of the wheel and other rivets projecting into the rounded margin of the rim; whereby the strain of the bolts presses home certain rivets without tendency to withdraw any rivets.

Signed at Chicago, in the county of Cook and State of Illinois, this 4th day of April, 1921.

WILLIAM ERASTUS WILLIAMS.

Witnesses:
B. J. BERNHARD,
F. ZOBEL.